(12) United States Patent
Sich et al.

(10) Patent No.: US 6,935,988 B2
(45) Date of Patent: Aug. 30, 2005

(54) INFINITELY VARIABLE TOROIDAL DRIVE

(75) Inventors: Bernhard Sich, Friedrichshafen (DE); Axel Matheis, Sauldorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 115 days.

(21) Appl. No.: 10/311,139

(22) PCT Filed: Jul. 28, 2001

(86) PCT No.: PCT/EP01/08771

§ 371 (c)(1),
(2), (4) Date: Dec. 13, 2002

(87) PCT Pub. No.: WO02/12754

PCT Pub. Date: Feb. 14, 2002

(65) Prior Publication Data

US 2003/0139252 A1 Jul. 24, 2003

(30) Foreign Application Priority Data

Aug. 4, 2000 (DE) ................................. 100 38 255.8

(51) Int. Cl.[7] ............................................. F16H 15/38
(52) U.S. Cl. ........................................ 476/40; 476/42
(58) Field of Search ....................... 476/16, 28, 41–46, 476/40

(56) References Cited

U.S. PATENT DOCUMENTS

| | | | |
|---|---|---|---|
| 4,086,820 A | 5/1978 | Kraus et al. | 74/200 |
| 4,694,704 A * | 9/1987 | Kraus | 476/41 |
| 4,934,206 A | 6/1990 | Nakano | 74/200 |
| 5,213,011 A | 5/1993 | Nobumoto et al. | 74/862 |
| 5,540,631 A | 7/1996 | Lohr, III et al. | 476/10 |
| 6,132,331 A * | 10/2000 | Imanishi et al. | 476/10 |
| 6,402,657 B1 | 6/2002 | Sich | 476/42 |

FOREIGN PATENT DOCUMENTS

| | | | | |
|---|---|---|---|---|
| DE | 197 54 725 A1 | 6/1999 | ........... | F16H/15/38 |
| DE | 198 26 057 A1 | 12/1999 | ........... | F16H/15/38 |
| JP | 11063133 | 3/1999 | ........... | F16H/15/38 |
| JP | 2000 027963 A | 1/2000 | | |

* cited by examiner

*Primary Examiner*—David M. Fenstermacher
(74) *Attorney, Agent, or Firm*—Davis & Bujold, P.L.L.C.

(57) ABSTRACT

An infinitely variable toroidal drive with several drive units wherein each drive unit has an input disc with a toroidal inner surface disposed coaxially in relation to the input shaft and an output disc with a toroidal inner surface disposed coaxially in relation to the input shaft and several friction wheels which are pivotably situated between each pair of input disc and output discs and mounted on a carrier, respectively. The infinitely variable toroidal drive has a device for support of the reaction forces appearing on the friction wheels due to the pressure of the discs, simultaneously synchronizing the pivoting angle of the carriers. The device consists of respective traction elements; one being provided on both the upper ends and the lower ends of the two carriers, and encircling the ends of the carriers and respectively having the shape of an 8.

2 Claims, 2 Drawing Sheets

INFINITELY VARIABLE TOROIDAL DRIVE

FIELD OF THE INVENTION

This invention relates to an infinitely variable toroidal drive

BACKGROUND OF THE INVENTION

Such an infinitely variable toroidal drive usually has input and output discs coaxially disposed in relation to a common shaft which are arranged in pairs and have toroidal inner surfaces, the same as friction wheels situated between the pairs of input and output discs. The friction wheels are in frictional contact both with the input discs and with the output discs and by friction contact transmit to the output disc the torque transmitted to them by the input disc, the rotational speed of the friction wheels being higher the greater the distance between their point of contact with the input disc and the axis of rotation. By tilting the friction wheels, it is accordingly infinitely and arbitrarily possible to adjust the rotational speed of the output disc. To this end, the axes of rotation of the friction wheels are each mounted on a carrier controllable via a pivoting device.

One such infinitely variable toroidal drive has been described in detail in the Applicant's DE 197 54 725. This drive contains two drive units coaxially disposed relative to the input shaft, each drive unit having one input disc and one output disc between which friction wheels are respectively situated, each friction wheel being fastened on one pivotable carrier. Both input and output discs are mounted upon a torque shaft which is slightly displaceable in an axial direction relative to the input shaft. The input disc of one drive unit is non-rotatably connected with the torque shaft but axially slidingly mounted upon it. The input disc of the other drive unit is also non-rotatably connected with the torque shaft by means of engaging gears. Both output discs of the two drive units are provided in the drive with mirror symmetry side by side and are situated upon a common bushing so that a torque transmitted by one input disc to the appertaining output disc and a torque transmitted by the other input disc to its appertaining output disc is transmitted by the two output discs non-rotatably connected with the bushing to a gear wheel which meshes with a gear wheel of an output shaft. A roller-shaped pressure device energizes one of the input discs which is movably supported in axial direction upon the input shaft and non-rotatably connected therewith.

In the infinitely variable toroidal drives already known, the ratio is usually adjusted by moving the friction wheels tangentially relative to the drive axis, but swiveling forces of the input and output discs act upon the friction wheel situated therebetween, since the former have to be pressed against the friction wheel for transmitting torque. In traditional infinitely variable drives, the friction wheel is placed in each drive unit so that the pivot axis thereof is situated in the central point of the torus defined by the appertaining input and output discs. In the contact points of the friction wheel with the appertaining input disc and output disc, so-called normal forces are generated at the place during adjustment of the ratio.

In the case of dissimilar normal forces appearing during the ratio adjustment, to prevent the implied torque thereby that appears on the friction wheel generates an undesired change of the ratio of the drive, it has already been proposed in the Applicant's DE 198 26 057 to compensate a possible difference of the normal forces by producing a control force and, when the friction wheel is axially retained, said control force, which leads to a rotation of the friction wheel, can be applied to one of the two appertaining discs while, when one of the discs is axially fixed, said control force acts upon the friction wheel.

It has already been proposed to support the friction wheels in an infinitely variable toroidal drive by connecting rods which counteract the reaction forces that appear. The rotation movement of the friction wheels is made possible here by roller bearings; but this arrangement also has the disadvantage of heavy weight of the toroidal wheel drive and a lack of coupling of the rotation movements of the two carriers placed in a drive unit for the friction wheels.

U.S. Pat. No. 4,934,206 has disclosed an infinitely variable toroidal drive with two drive units wherein, in the first drive unit, two carriers and two friction wheels are placed and likewise, in the second drive unit two carriers and two friction wheels are placed. The carriers are interconnected via a total of four rotary belts; one belt connecting two carriers with each other, and each belt having the shape of an eight, that is, having an intersection axially between the two carriers it connects. By said arrangement of belts, a synchronization is obtained on the movements of the carriers for the friction wheels interconnected by the belts. The belts are located on the lower ends of the carriers in the proximity of the longitudinal axis of the drive and serve exclusively for the synchronization of the appertaining carriers. The same as in the transitional toroidal drives, the upper ends of the carriers are supported on the inner wall of the drive housing by yokes, clamps and bearings.

The problem to be solved by this invention is to improve an infinitely variable toroidal drive in the sense of making both the reaction forces acting upon the friction wheels and a synchronization of the rotary movements of the appertaining carriers possible, at low cost and with a single part.

This problem is solved by the features stated in the single claim.

SUMMARY OF THE INVENTION

It is provided, according to the invention, that on the upper ends and on the lower ends of both carriers a traction element is provided which substantially encircles the corresponding ends and which is arranged in the form of an 8 to produce a synchronous, double-motion, rotary movement of the carriers with an intersection lying axially between the two carriers.

This traction element in the form of an endless cable, for example, has only a light bulk needing only a small installation space whereby the construction investment is reduced. At the same time the traction element makes both the assimilation of the reaction forces upon the friction wheels and a synchronization of the pivoting angle of both appertaining carriers in each drive unit possible.

BRIEF DESCRIPTION OF THE DRAWINGS

The invention will now be described, by way of example, with reference to the accompanying drawings in which.

DETAILED DESCRIPTION OF THE INVENTION

Figure 1:
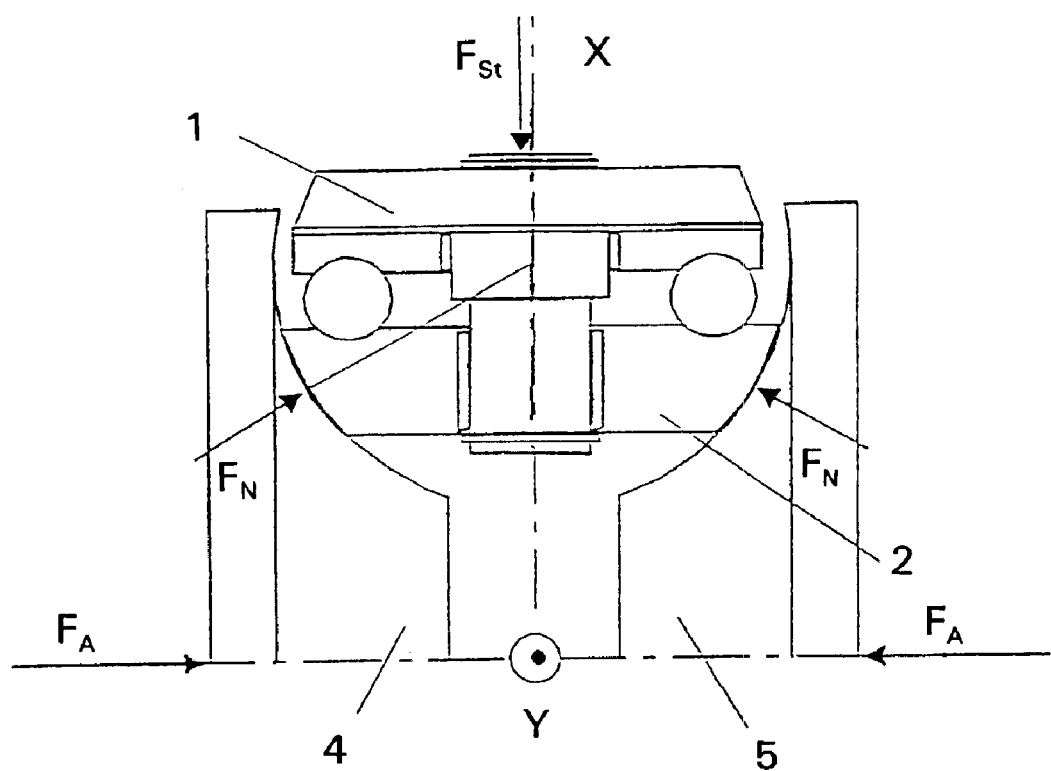
FIG. 1 diagrammatically shows a section through one part of a drive unit for representing the forces that appear.

The construction and operating mode of infinitely variable toroidal wheel drives are well known to the expert so that there will be shown and explained herebelow only the parts necessary for on understanding of the invention; the same reference numerals have been given to the same parts in the figures.

Figure 2:
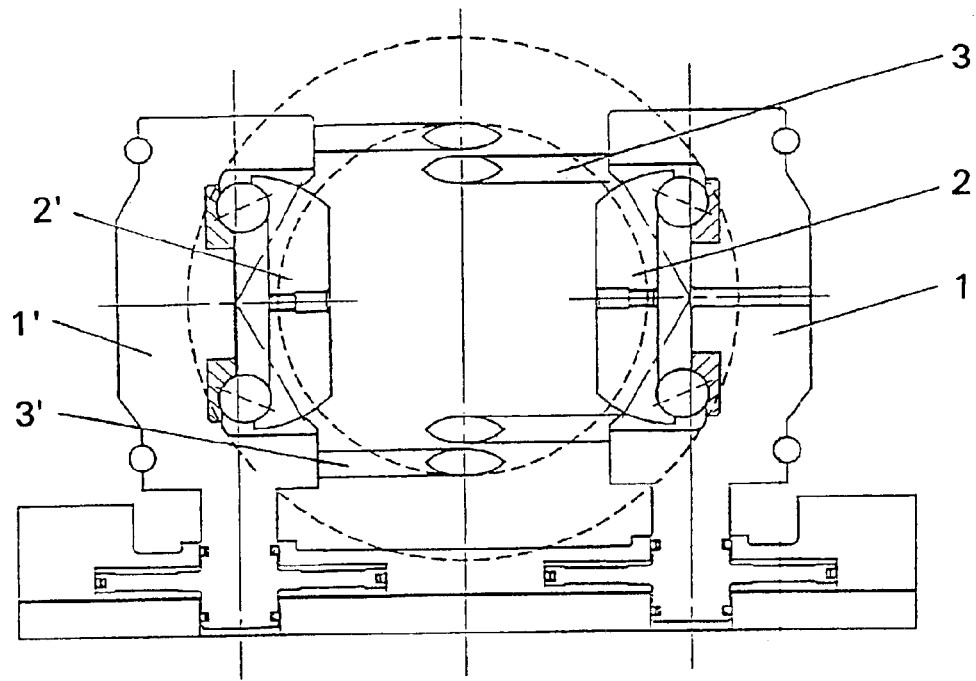
FIG. 2 shows a radial section through one part of a drive unit.

In FIG. 2, reference numerals 1 and 1' designate the carriers, reference numerals 2 and 2' designate the friction wheels, reference numerals 3 and 3' designate the inventive traction element and reference numerals 4 and 5 designate the input and output discs of a drive unit. As can be understood from FIG. 1, in such an infinitely variable toroidal drive reaction forces generate in a radial direction due to the pressure $F_A$ of the two discs on the friction wheels 2, 2'. In order to be possible for the friction wheels to be held in their located position, they must be supported against said reaction forces.

A uniform adjustment of all friction wheels is indispensable for operation of an infinitely variable toroidal drive having several friction wheels. A synchronization of the pivot angles of two friction wheels, located opposite to each other, advantageously has a stabilizing effect upon the total adjustment behavior of the toroidal drive.

Figure 3:
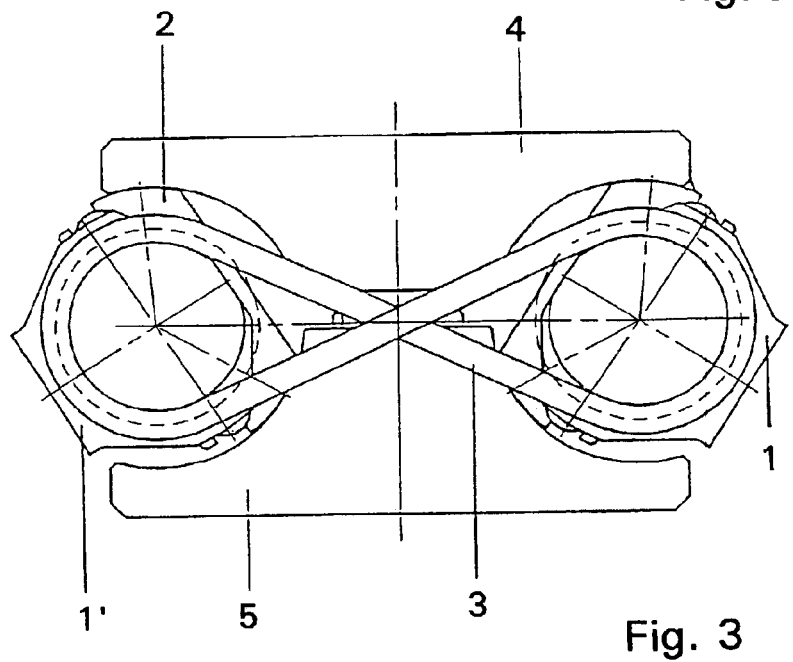
FIG. 3 shows a top view of said representation of FIG. 2.

Therefore, as results from FIGS. 2 and 3, the invention provides a respective traction element 3, 3', on both the upper ends and on the lower ends of the two carriers 1, 1' belonging to a drive unit, both carriers 1, 1' being substantially encircled by the two traction elements 3, 3' (FIG. 3). To synchronize the double motion pivotal movements of the carriers 1, 1' with the friction wheels 2, the traction elements 3, 3' are arranged in the form of an 8 so that an intersection is formed between the two carriers 1, 1'.

By using two traction elements 3, 3' of which one is situated on the two lower ends, that is, the ends of the carrier facing the drive axis, and the other on the upper ends facing the housing wall of the appertaining carriers, it is possible, therefore, to ensure both functions "assimilate the reaction force" and "synchronous adjustment" since thereby the hitherto customary parts for assimilating the reaction forces on the upper ends of the carriers are eliminated, thus reducing the capital investment of the drive and also the production costs.

Reference Numerals

1 carrier
2 friction wheel
3 traction element
3' traction element
4 disc
5 disc

We claim:

1. An infinitely variable toroidal drive comprising:

a plurality of drive units, each drive unit having an input shaft provided coaxially in relation to an input disc having a toroidal inner surface and an output disc disposed coaxially in relation to the input shaft and having a toroidal inner surface, and each input disc and output disc forming a drive pair;

a plurality of friction wheels pivotally disposed between the inner surfaces of the drive pairs of the input disc and the output disc and each of the drive pairs supported on one carrier for transmitting torque from the input disc to an appertaining output disc by pivoting of the carriers and friction wheels associated therewith;

a pressure device for biasing one of said input discs in a direction toward the output disc;

wherein a first traction element (3) is provided on upper ends of said carriers and a second traction element (3') is provided on lower ends of said carriers (1) of each drive unit, each traction element substantially encircles corresponding ends of said carriers and is arranged in the form of a FIG. 8, and each traction element has an intersection lying axially, between said two carriers (1, 1'), to produce a pivotal double movement of said carriers (1, 1').

2. An infinitely variable toroidal drive according to claim 1, wherein the first and second traction elements (3, 3'), on the upper and the lower ends of said carriers, ensures both assimilating of a reaction force and synchronous adjustment of the toroidal drive.

\* \* \* \* \*